(12) United States Patent
Kim et al.

(10) Patent No.: US 7,835,763 B2
(45) Date of Patent: Nov. 16, 2010

(54) METHOD FOR DISPLAYING DIGITAL BROADCASTING CHANNEL INFORMATION IN WIRELESS TERMINAL

(75) Inventors: Kang-Wook Kim, Daegu (KR); Jong-Kerl Lee, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 1186 days.

(21) Appl. No.: 11/350,140

(22) Filed: Feb. 8, 2006

(65) Prior Publication Data
US 2007/0093276 A1    Apr. 26, 2007

(30) Foreign Application Priority Data
Oct. 24, 2005    (KR) ...................... 10-2005-0100289

(51) Int. Cl.
*H04M 1/00*    (2006.01)
(52) U.S. Cl. .................. 455/550.1; 455/566; 455/575.3
(58) Field of Classification Search .............. 455/550.1, 455/566, 575.3
See application file for complete search history.

(56) References Cited

U.S. PATENT DOCUMENTS

| | | | | |
|---|---|---|---|---|
| 6,459,906 | B1 * | 10/2002 | Yang ........................ | 455/556.1 |
| 6,529,742 | B1 * | 3/2003 | Yang ........................ | 455/556.1 |
| 6,915,119 | B1 * | 7/2005 | Konishi .................... | 455/127.1 |
| 6,980,835 | B2 * | 12/2005 | Hama ........................ | 455/567 |
| 7,054,592 | B2 * | 5/2006 | Tatsumi et al. ............. | 455/3.06 |
| 7,076,202 | B1 * | 7/2006 | Billmaier ................... | 455/3.04 |
| 7,173,665 | B2 * | 2/2007 | Kawasaki et al. ........... | 348/376 |
| 7,359,740 | B2 * | 4/2008 | Okuzako et al. ......... | 455/575.3 |
| 2005/0070327 | A1 * | 3/2005 | Watanabe ................ | 455/552.1 |
| 2006/0080709 | A1 * | 4/2006 | Kwon et al. ................... | 725/46 |
| 2006/0233373 | A1 * | 10/2006 | Kang ......................... | 380/257 |

(Continued)

FOREIGN PATENT DOCUMENTS

CN        1295421        5/2001

(Continued)

*Primary Examiner*—Yuwen Pan
(74) *Attorney, Agent, or Firm*—The Farrell Law Firm, LLP

(57) ABSTRACT

A method is disclosed displaying digital broadcasting channel information in a wireless terminal. The method for displaying digital broadcasting channel information in a folder-type wireless terminal including a main body and a sub-body installed on the main body in such a manner that the sub-body is movable between opened and closed positions with respect to the main body, the sub-body including an internal display part installed on an inside surface of the sub-body and an external display part installed on an outside surface of the sub-body, includes creating a list of current broadcast programs for channels based on digital broadcast program guide data, which are previously stored, if a predetermined key is input in a state where the sub-body is opposite to the main body, and displaying the created list of the current broadcast programs for channels on the external display part. A user utilizing a folder-type wireless terminal can easily determine channel information of a digital broadcasting service, which is currently broadcasted, through the external display part without opening a sub-body (i.e. folder) of the folder-type wireless terminal. In addition, it is possible to simply determine channel information of a digital broadcasting service, which is currently broadcasted, only by inputting a predetermined key when the folder of the folder-type wireless terminal is closed.

12 Claims, 6 Drawing Sheets

U.S. PATENT DOCUMENTS

| | | | |
|---|---|---|---|
| 2007/0061832 A1* | 3/2007 | Kim et al. | 725/14 |
| 2007/0083891 A1* | 4/2007 | Moon | 725/39 |
| 2007/0091206 A1* | 4/2007 | Bloebaum | 348/460 |
| 2007/0109445 A1* | 5/2007 | Lee | 348/559 |
| 2007/0242783 A1* | 10/2007 | Nishi | 375/344 |

FOREIGN PATENT DOCUMENTS

| | | |
|---|---|---|
| CN | 1441599 | 9/2003 |
| CN | 1662059 | 8/2005 |

\* cited by examiner

METHOD FOR DISPLAYING DIGITAL BROADCASTING CHANNEL INFORMATION IN WIRELESS TERMINAL

PRIORITY

This application claims priority to an application entitled "Method for Displaying Digital Broadcasting Channel Information in Wireless Terminal" filed in the Korean Intellectual Property Office on Oct. 24, 2005 and assigned Serial No. 2005-100289, the contents of which are incorporated herein by reference.

BACKGROUND OF THE INVENTION

1. Field of the Invention

The present invention relates to a folder-type wireless terminal, and more particularly to a method for displaying digital broadcast channel information of a folder-type wireless terminal capable of receiving digital broadcasting.

2. Description of the Related Art

Generally, digital broadcasting denotes a broadcast service providing a user with a high-definition, high sound quality, and superior service in place of the conventional analog broadcasting, and is classified into satellite digital broadcasting and terrestrial digital broadcasting.

Satellite digital broadcasting mainly pursues a mobile service and allows a user to view multi-channel multimedia broadcasting regardless of time and location through a portable receiver (a mobile phone, or a personal digital assistant) or a vehicle receiver.

Terrestrial digital broadcasting derived from digital audio broadcasting (DAB), is multimedia broadcasting received by a user during movement using an empty VHF 12 channel and denotes complex broadcasting such as transmitting television broadcasting, radio broadcasting, and data broadcasting using multi-channels.

Recently, as digital broadcasting techniques and mobile communication techniques have been developed, interest in a digital broadcasting service allowing a user to view digital broadcasting while moving has increased. In particular, the interest in a digital multimedia broadcasting (DMB) service using a mobile communication terminal is growing.

One of the advantages of such a digital broadcasting service is that the digital broadcasting service has a channel efficiency superior to that of an analog broadcasting service. In other words, although the analog broadcasting service has only one program for one physical channel, the digital broadcasting service is capable of simultaneously transmitting several programs through one physical channel. Accordingly, it is necessary for the digital broadcasting service to provide program information to make it easy to select programs desired by viewers. A service provided for this is an electronic program guide (EPG) service.

In other words, the EPG service provides information ("digital broadcast program guide data") reporting the type of a broadcast program and a broadcasting channel, which are currently provided to a user, and a starting time, or a termination time of a broadcast program to be provided.

The digital broadcast program guide data includes program information (e.g., a program name, description about a program, the class of a program, etc.) according to channels or time. The digital broadcast program guide data is provided with a predetermined period of time or when the digital broadcast program guide data are changed.

Therefore, digital broadcasting receiving devices, including wireless terminals capable of receiving digital broadcasting, store the digital broadcast program guide data therein by receiving the digital broadcast program guide data and then generate digital broadcast program information based on the stored digital broadcast program guide data in response to user demand so as to provide the digital broadcast program information to a user. In addition, the digital broadcasting receiving devices may receive digital broadcast program guide data in response to user demand, generate digital broadcast program information, and then provide the digital broadcast program information to a user.

In the meantime, a folder-type wireless terminal typically includes LCDs, that is, an external display part and an internal display part formed on both sides of a sub-body (i.e., folder) of the folder-type wireless terminal.

The external display part of the folder-type wireless terminal typically displays electric field intensity, a residual amount of a battery, a time and a date on one screen image in a waiting state. Since the external display part is relatively smaller than the internal display part, the digital broadcasting channel information is usually displayed on the internal display part having the relatively larger size.

For this reason, users utilizing the folder-type wireless terminal including the internal display part and the external display part described above must open a folder of the wireless terminal in order to receive digital broadcasting channel information. Thereafter, the users enter into a digital broadcasting mode through key manipulation and then request digital broadcasting channel information by manipulating a menu key, and the folder-type wireless terminal displays the requested digital broadcasting channel information on the internal display part.

However, this scheme has a problem in that the users must open the folder of the folder-type wireless terminal even though they only want to confirm the digital broadcasting channel information without viewing digital broadcasting, and key manipulation must be performed several times.

SUMMARY OF THE INVENTION

Accordingly, the present invention has been made to solve the above-mentioned problems occurring in the prior art, and an object of the present invention is to provide a method for displaying digital broadcasting channel information enabling a user to easily confirm digital broadcasting channel information in a folder-type wireless terminal.

To accomplish the above and other objects, there is provided a method for displaying digital broadcasting channel information in a folder-type wireless terminal including a main body and a sub-body installed on the main body in such a manner that the sub-body is movable between opened and closed positions with respect to the main body, the sub-body including an internal display part on an inside part of the sub-body and an external display part on an outside part of the sub-body, the method including creating a list of current broadcast programs for channels based on digital broadcast program guide data, which are previously stored, if a predetermined key is input in a state where the sub-body is opposite to the main body, and displaying the created list of the current broadcast programs for channels on the external display part.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
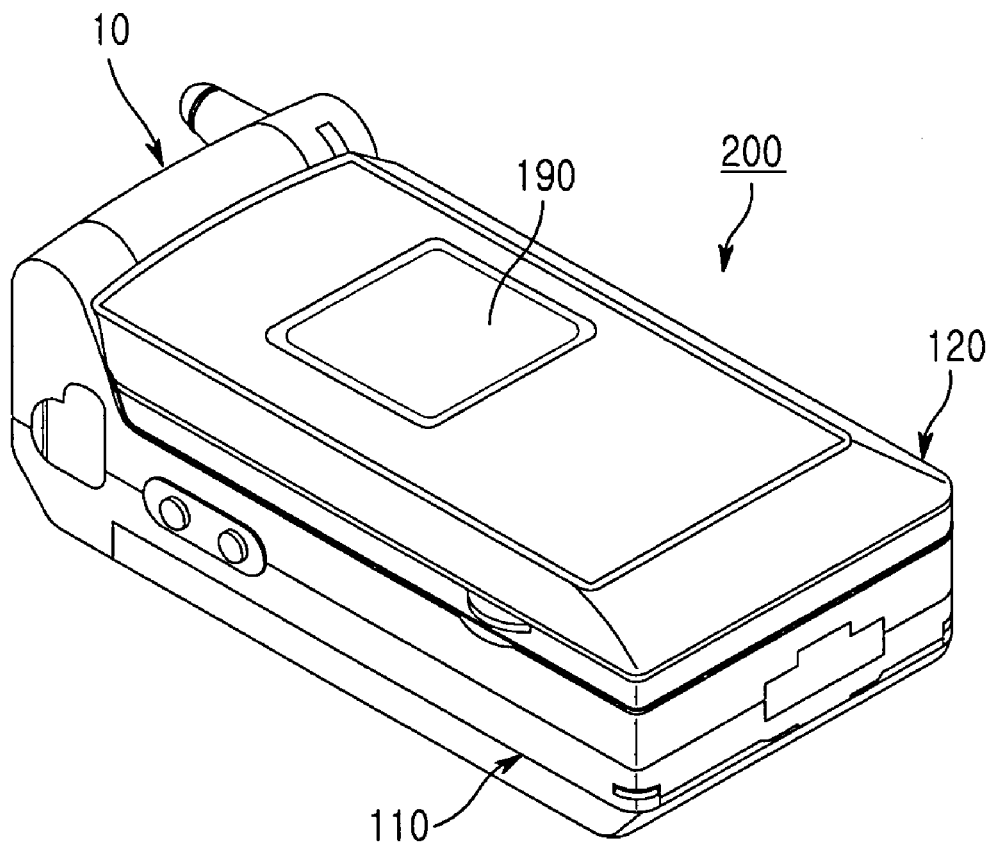
FIG. 1 is a perspective view illustrating a folder-type wireless terminal when a sub-body of the folder-type wireless terminal is closed with respect to a main body according to the present invention.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

Figure 2:
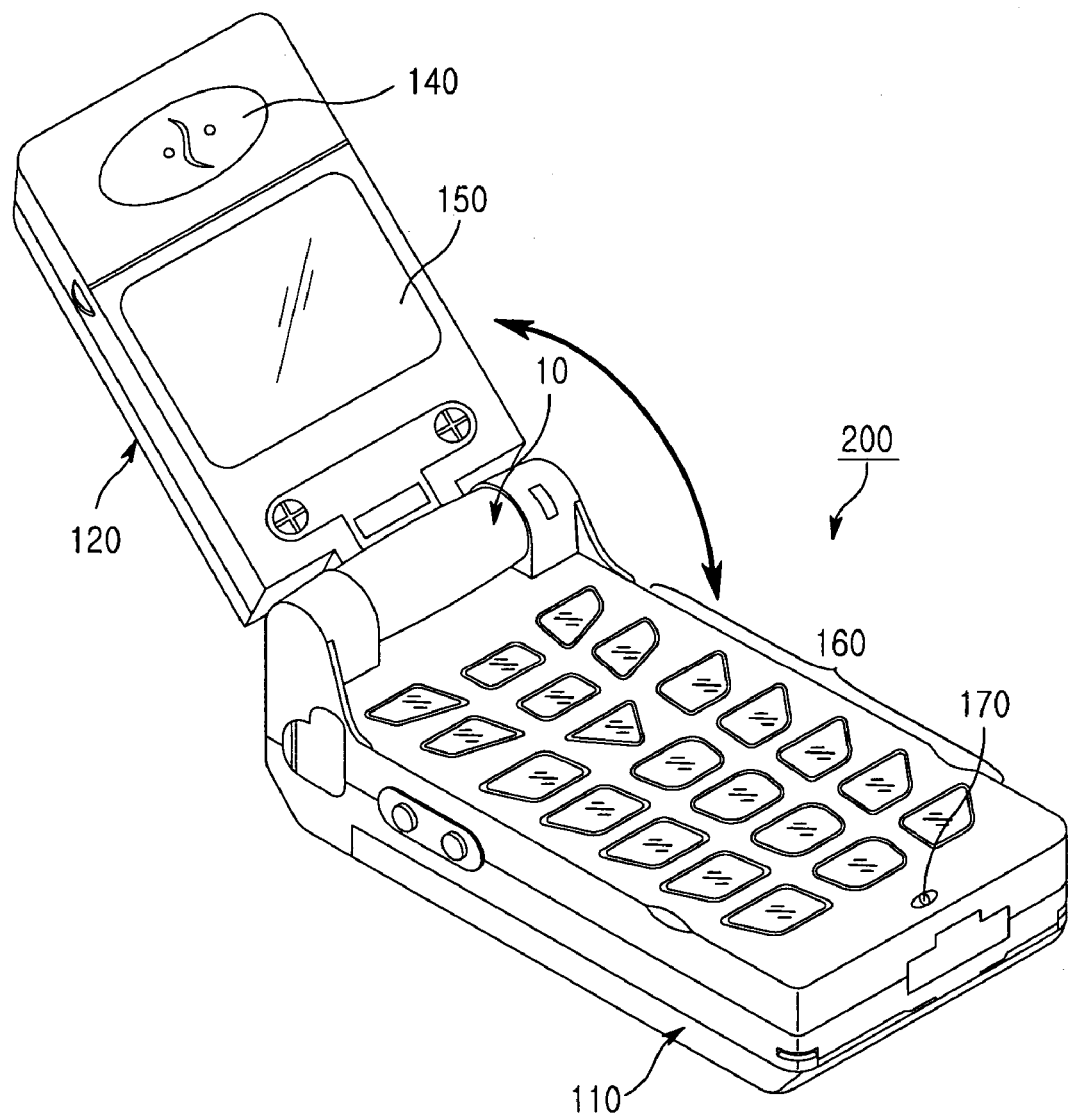
FIG. 2 is a perspective view illustrating a folder-type wireless terminal when the sub-body is opened away from a main body of the folder-type wireless terminal according to the present invention.

FIG. 1 is a perspective view illustrating a folder-type wireless terminal 200 when a sub-body 120 of the folder-type wireless terminal 200 is closed with respect to a main body 110 of the folder-type wireless terminal 200. FIG. 2 is a perspective view illustrating the folder-type wireless terminal 200 when the sub-body 120 is opened away from the main body 110.

The folder-type wireless terminal 200 includes the main body 110, the sub-body 120 rotatably installed on the main body 110 within a predetermined angle, and a hinge unit 10 allowing the sub-body 120 to be rotated on the main body 110.

Generally, as shown in FIG. 2, an earpiece part 140 is positioned on the inside surface of the sub-body 120, and an internal display part 150 for displaying data is installed below the earpiece part 140. In addition, the main body 110 includes a key pad 160 nested therein having a plurality of key buttons (input units for inputting data to the internal display part 150) and a microphone unit 170 positioned at a lower side of the main body 110, which is used for delivering a voice to a counterpart. As shown in FIG. 1, an external display part 190 is installed on an outside surface of the sub-body 120.

Figure 3:
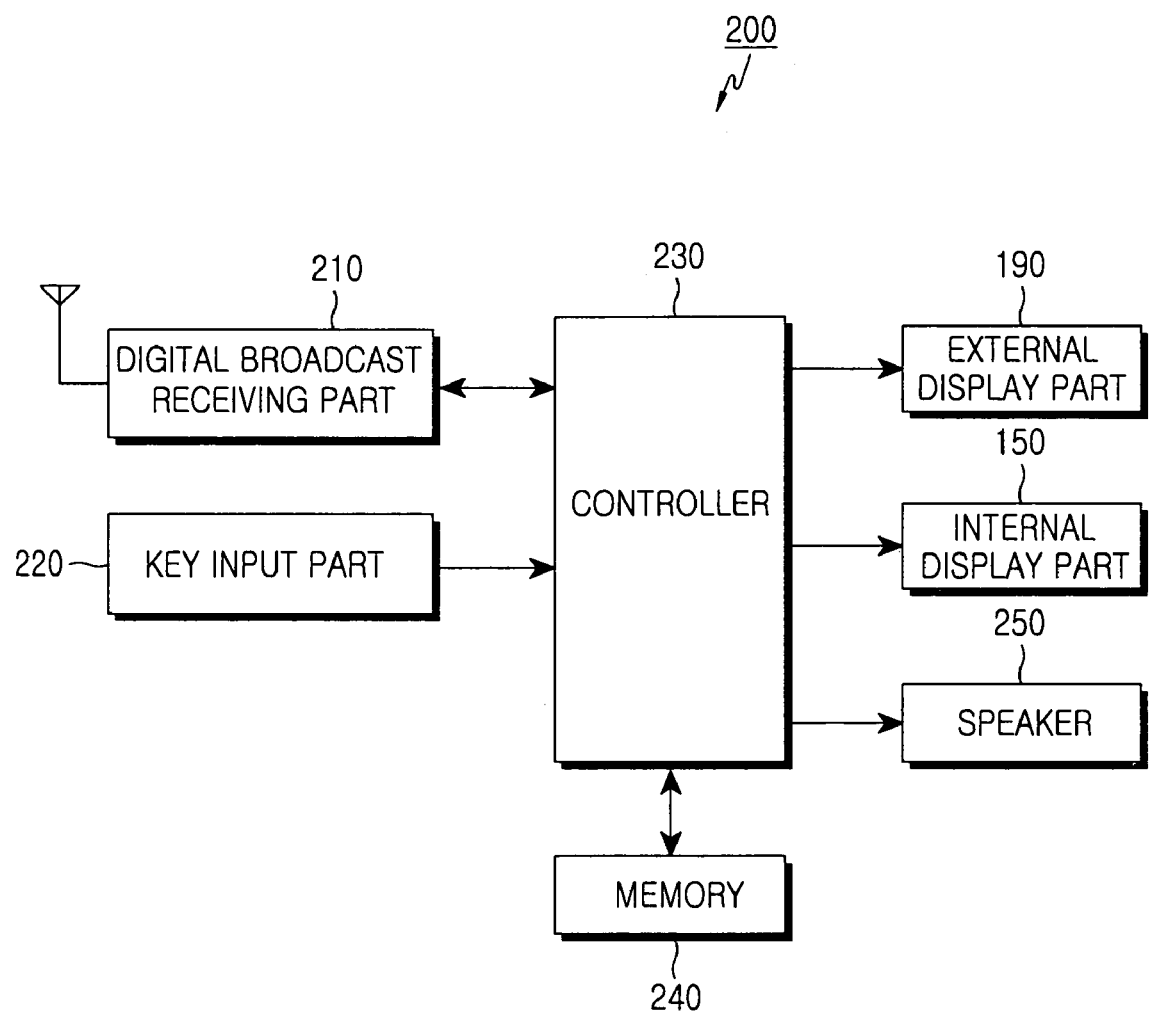
FIG. 3 is a block diagram illustrating the structure of a folder-type wireless terminal according of the present invention.

FIG. 3 is a block diagram illustrating the structure of the folder-type wireless terminal according to the present invention. It is assumed that the folder-type wireless terminal is capable of receiving digital broadcasting and includes the internal display part and the external display part.

The folder-type wireless terminal 200 shown in FIG. 3 includes a digital broadcasting receiving part 210, a key input part 220, a controller 230, a memory 240, a speaker 250, an external display part 190, and an internal display part 150.

The digital broadcasting receiving part 210 receives digital broadcast program guide (i.e., electronic program guide) data and digital broadcasting data through a predetermined channel and outputs the received digital broadcasting data by de-modulating the received digital broadcasting data into a digital data stream under the control of the controller 230. The predetermined channel denotes a channel selected by a user. The digital broadcasting receiving part 210 may have a de-modulation part (not shown) for de-modulating digital broadcasting data into a digital data stream even though the de-modulation part is not shown in FIG. 3.

The key input part 220 has a key metric structure (not shown) and outputs a key input signal (i.e., a manipulation signal of a user) corresponding to a key input by the user to the controller 230 by including characters key, numeral keys, a variety of functional keys, and an external key (e.g., a volume key).

The controller 230 controls the operation of the folder-type wireless terminal 200 according to the present invention. In addition, the controller 230 decodes digital broadcasting data de-modulated and delivered in the digital broadcasting receiving part 210 so as to output the digital broadcasting data to the internal display part 150 and the speaker 250 through a video signal processing part (not shown) and an audio signal processing part (not shown). In the meantime, it is preferred that the controller 230 includes a de-multiplexing part (not shown) used for dividing the de-modulated digital broadcasting data into an audio data stream and a video data stream by de-multiplexing the de-modulated digital broadcasting data.

In addition, if a predetermined key is input when the sub-body 120 is in a closed position with respect to the main body 110, that is, when the sub-body is positioned on the main body 110 as in FIG. 1, the controller 230 creates a list of current broadcast programs according to channels based on digital broadcast program guide data. In this case, it is preferred that the controller 230 updates the digital broadcast program guide data before creating a list of current broadcast program according to channels based on the digital broadcast program guide data.

Meanwhile, it is preferred that the predetermined key is a key (e.g., a volume key) on the outside of the wireless terminal 200 because the sub-body 120 is closed, and the broadcast program list according to channels includes channel names (or channel numbers) and program names.

In addition, it is preferred that, in order to prevent a malfunction due to mistaken input of a key, the controller 230 creates a list of broadcast programs according to channels when the key is input for longer than a preset time interval (e.g., one second or two seconds).

The controller 230 displays the created list of the broadcast programs according to channels on the external display part 190. In this case, the controller 230 may display the list of the broadcast programs according to channels while slidably scrolling the list in the transverse direction or an upward or downward direction.

If the sub-body 120 is opened away from the main body 110 as in FIG. 2 when the created list of the broadcast programs according to channels is displayed on the external display part 190, the controller 230 may control the internal display part 150 to display the created list of the broadcast programs according to channels. In this case, it is preferred that the controller 230 does not display the list of the broadcast programs according to channels on the external display part 190.

If a predetermined channel is selected from the list of the broadcast programs according to channels displayed on the internal display part 150 based on user selection information, the controller 230 receives a program broadcasted through the selected channel by means of the digital broadcasting receiving part 210 and outputs the program to the internal display part 150 and the speaker 250.

A memory 240 stores a variety types of information required for controlling the operation of the wireless terminal 200 according to the present invention. The memory 240 receives and stores digital broadcast program guide data including information about digital broadcast programs by means of the digital broadcasting receiving part 210. The digital broadcast program guide data is updated with a predetermined period of time under the control for the controller 230.

The external display part 190 and the internal display part 150 output a variety of display data generated in the wireless terminal 200. In particular, it is preferred that a display part for outputting digital broadcasting (e.g., the internal display part 150) includes a liquid crystal display (LCD) capable of supporting the resolution of the digital broadcasting data. In this case, if the LCD is realized through a touch screen scheme, the internal display part 150 may operate as the input part.

The speaker 250 audibly outputs digital broadcasting data and digital broadcast program guide data received through the digital broadcasting receiving part 210.

In the meantime, the wireless terminal 200 may have an RF part (not shown) for transmitting/receiving voice data, character data, video data, and control data under the control of the controller 230 even though the RF part is not shown.

Figure 4:
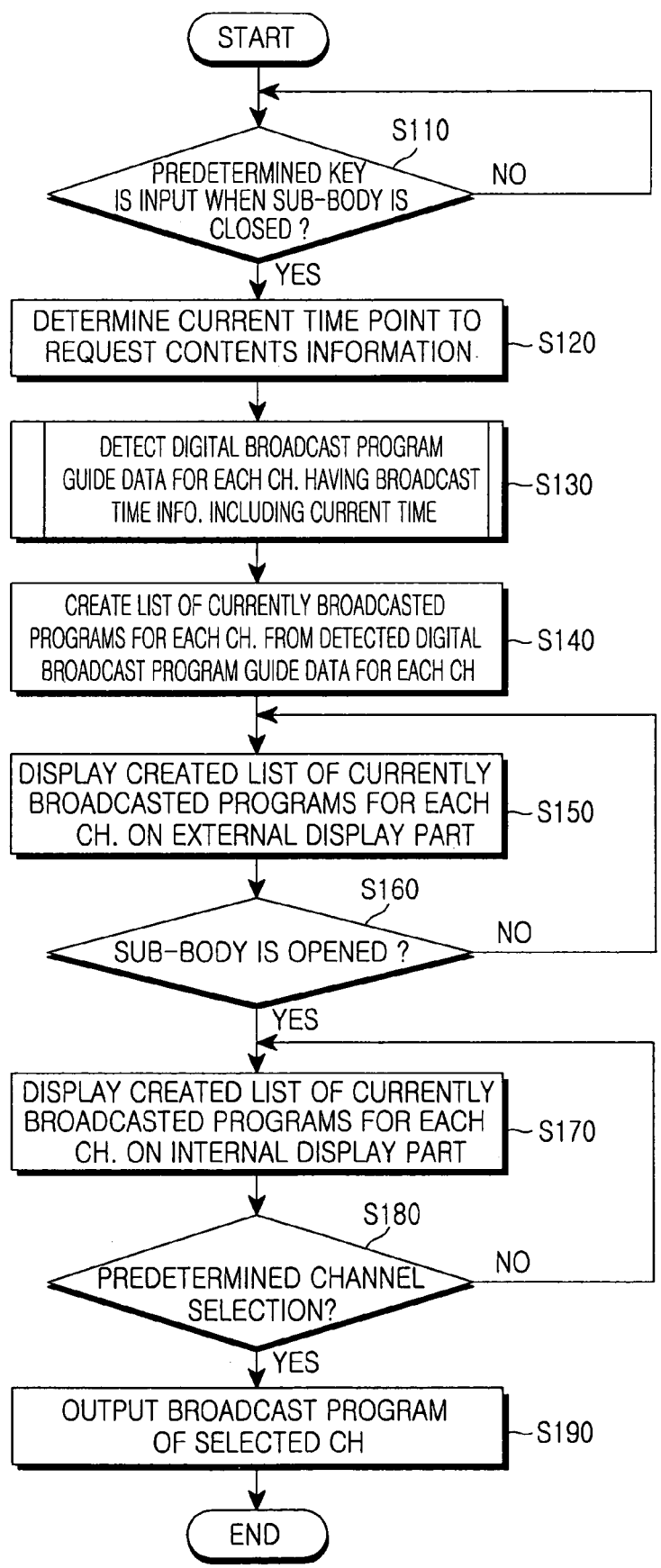
FIG. 4 is a flowchart illustrating the operational procedure of a wireless terminal according to the present invention.

FIG. 4 is a flowchart illustrating the operational procedure of the wireless terminal according the present invention, and the operation procedure will be described with reference to FIGS. 1 to 4.

The controller 230 determines if a predetermined key is input in a state where the sub-body 120 is closed in step S110. It is preferred that the predetermined key is set as a key on the outside of the wireless terminal 200 among keys included in the key input part 220. The key on the outside of the wireless terminal 200 may be a volume key.

If the predetermined key is input, the controller 230 determines a current time in step S120. To this end, the controller 230 may have a timer (not shown). In this case, it is preferred that, in order to prevent a malfunction of the wireless terminal 200 due to a mistaken input of a key, the controller 230 determines the current time when the predetermined key is input above a preset time interval (e.g., one second or two seconds).

After the current time is checked in step S120, the controller 230 detects digital broadcast program guide data according to channels having broadcasting time information including the determined current time based on digital broadcast program guide data stored in the memory 240 in step S130. In this case, the wireless terminal 200 may additionally have a detection part (not shown) for detecting the digital broadcast program guide data according to channels. Meanwhile, a detailed description about step S130 will be given later with reference to FIG. 5.

Figure 6:
FIG. 6 is a screen image illustrating the operational procedure of a folder-type wireless terminal according to the present invention.

The controller 230 creates a list of current broadcast programs (having broadcasting time information including the determined current time) according to channels based on the detected digital broadcast program guide data according to channels in step S140. The list of the broadcast programs according to channels includes channel names and program names. The controller 230 then displays the created list of the broadcast programs according to channels on the external display part 190, as shown in FIG. 6, in step S150. FIG. 6 is a screen image illustrating the created list of the current broadcast program according to channels on the wireless terminal 220.

In the meantime, it is preferred that the controller 230 employs a scheme for slidably scrolling the list of the broadcast programs in the transverse direction or an upward or downward direction when the controller 230 displays the list of the broadcast programs according to channels on the external display part 190. This scheme is employed because the entire list of the broadcast programs according to channels typically cannot be displayed due to the size of the external display part 190 being smaller than that of the internal display part 150. Since the list of the broadcast programs according channels is displayed on the external display part 190 through a sliding scheme as described above, a user may recognize the list of the current broadcast programs according to channels through the external display part 190 without an additional key manipulation in order to confirm the list of the broadcast programs according to channels for each item.

In step 160, the controller 230 determines if the sub-body 120 is opened away from the main body 110 when the list of broadcast programs according to channels is displayed on the external display part 190. To this end, the controller 230 may have an additional sensor. In addition, since there are many techniques to determine the detection by the sensor whether the sub-body 120 is open, a description of the detection by the sensor is omitted.

If the sub-body 120 is opened away from the main body, the controller 230 displays the created list of the broadcast programs according to channels on the internal display part 150 in step S170. In this case, it is preferred that the controller 230 does not display the created list of the broadcast programs according to channels on the external display part 190.

In step S180, the controller 230 determines if a predetermined channel is selected in the displayed list of the broadcast programs according to channels. If the key input part 220 includes directional keys, a user may select a desired channel in the list of the broadcast programs according to channels by inputting the directional keys. In addition, the user may select the desired channel by personally inputting a channel number through the input of a key included in the key input part 220.

If the predetermined channel is selected based on the list of the broadcast programs according to channels, the controller 230 outputs a current broadcast program (which is broadcasted at a current time) through the selected channel based on the detected digital broadcast program guide data-according to channels in step S190. At this time, if the predetermined channel is selected, the controller 230 may read out detailed information about the current broadcast program (that is, broadcasted at a current time) through the selected channel based on the detected digital broadcast program guide data according to channels and display the detailed information. The detailed information includes a time of starting the broadcasting of a corresponding program, a time of terminating the broadcasting of the corresponding program, a main actor/actress, a directory, and the rating of the corresponding program. In this case, it is preferred that the controller 230 outputs a corresponding broadcast program if there is an acknowledgement of a user in the state of displaying the detailed information.

Figure 5:
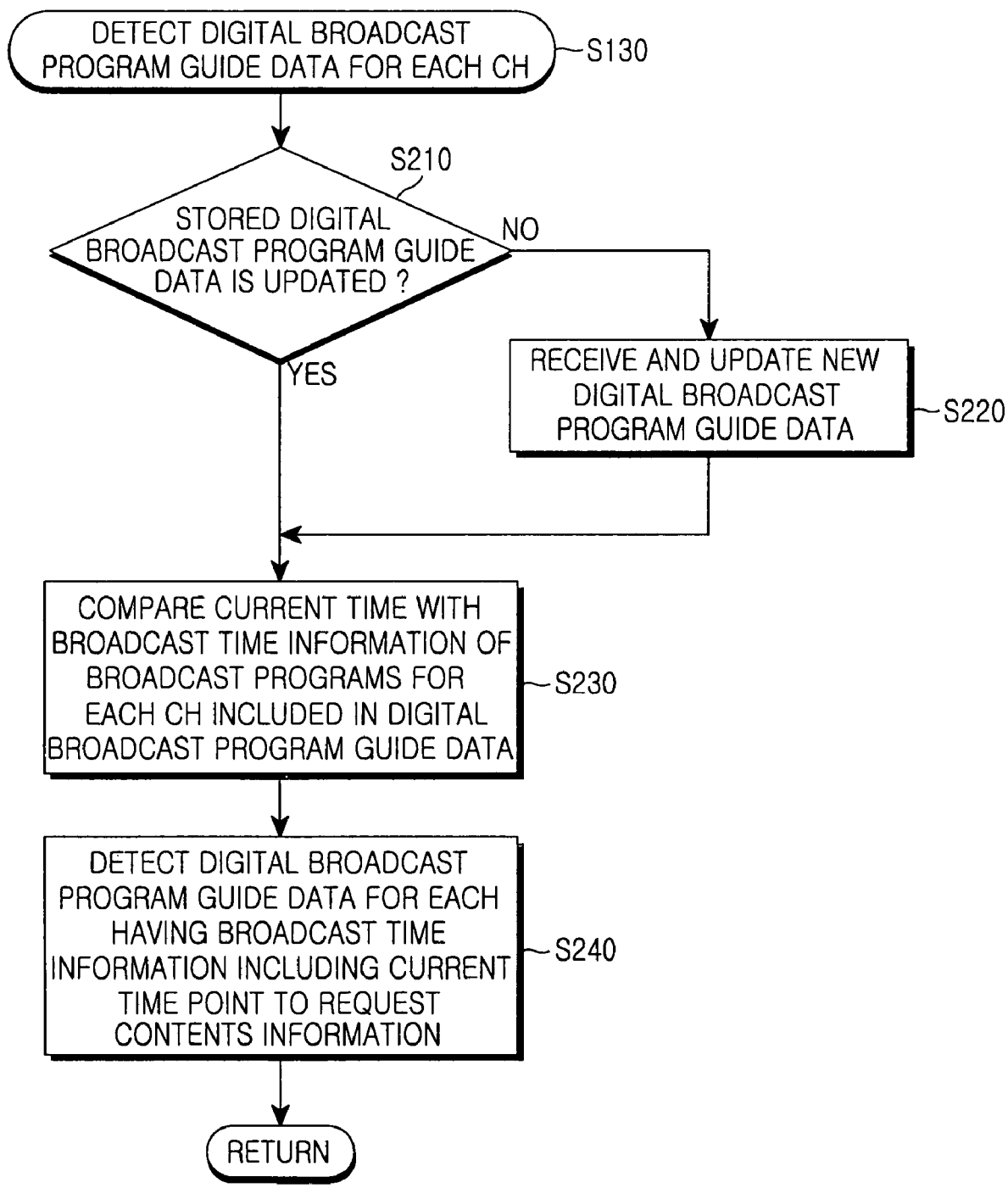
FIG. 5 is a flowchart illustrating a procedure of detecting digital broadcast program guide data according to channels in the operational procedure shown in FIG. 4.

FIG. 5 is a flowchart illustrating a procedure of detecting digital broadcast program guide data according to channels in the operational procedure shown in FIG. 4. In other words, FIG. 5 is a flowchart illustrating step S130 of FIG. 4 in detail.

Referring to FIGS. 3 and 5, the controller 230 determines if digital broadcast program guide data stored in the memory 240 has been updated in step S210 after determining a current time in step S130 of FIG. 4.

If the digital broadcast program guide data has not been updated as the determination result, the controller 230 updates digital broadcast program guide data stored in the memory 240 by receiving the new digital broadcast program guide data through the digital broadcasting receiving part 210 in step S220.

The controller 230 compares the determined current time with broadcasting time information of broadcast programs according to channels included in the digital broadcast program guide data in step S230. In this case, it is preferred that the controller 230 may use an event information table (EIT) information among a network information table (NIT) information, a broadcaster information table (BIT) information, and a service description table (SDT) information, which are included in digital broadcast program guide data in the case of satellite digital broadcasting.

The NIT information includes a network name and information relating to a satellite. The BIT information is used for transmitting information about a broadcasting station, and the information about the broadcasting station includes common knowledge, the name of the broadcasting station, and a list of current channels. In addition, the SDT information is used for transmitting information about each channel and includes the name of an organized channel, the name of a consignment broadcasting operator, uniform resource locator (URL) information about channels, and a channel type. The EIT represents information about each program and includes a channel number, a program name, program URL information, program broadcasting time information, and a brief description of a program.

Accordingly, it is preferred that the controller 230 uses the EIT information including broadcasting time information about a predetermined broadcast program in order to detect digital broadcast program guide data according to channels having broadcasting time information including the determined current time by comparing the determined current time with broadcasting time information of broadcast programs according to channels included in the digital broadcast program guide data.

In the case of terrestrial digital broadcasting, the controller 230 may compare the determined current time with broadcasting time information of broadcast programs according to channels included in the digital broadcast program guide data through a fast information channel (FIC) of the terrestrial digital broadcasting frame.

In step 240, based on the digital broadcast program guide data, the controller 230 detects digital broadcast program guide data according to channels having broadcasting time information including the determined current time.

In the meantime, digital broadcast program guide data through the procedures shown in FIGS. 4 and 5 may be received when a user inputs a predetermined key. The digital broadcast program guide data may be received by the digital broadcasting part 210 and stored in the memory 240 with a predetermined period (a transmission period of a broadcasting operator providing digital broadcast program guide data) regardless of the key input of the user.

As described above, according to the present invention, a user utilizing a folder-type wireless terminal including the internal display part and the external display part can easily determine channel information of a digital broadcasting service, which is currently broadcasted, through the external display part without opening a sub-body of the folder-type wireless terminal, that is, the folder of the wireless terminal.

In addition, according to the present invention, it is possible to simply determine channel information of a digital broadcasting service, which is currently broadcasted, only by inputting a predetermined key when the folder of the folder-type wireless terminal is closed.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for displaying digital broadcasting channel information in a folder-type wireless terminal including a main body and a sub-body installed on the main body in such a manner that the sub-body is movable between opened and closed positions with respect to the main body, the sub-body including an internal display part installed on an inside surface of the sub-body and an external display part installed on an outside surface of the sub-body, the method comprising the steps of:

determining a current time, if a predetermined key is input in a state where the sub-body is closed on the main body;

detecting digital broadcast program guide data for channels having broadcasting time information including the current time from previously stored digital broadcast program guide data;

creating a list of current broadcast programs for the channels based on the digital broadcast program guide data; and displaying the created list of the current broadcast programs for the channels on the external display part.

2. The method as claimed in claim 1, wherein, in creating the list of current broadcast programs for the channels, the list of the current broadcast programs for the channels is created based on the digital broadcast program guide data, which are previously stored, if the predetermined key is input for longer than a predetermined time interval.

3. The method as claimed in claim 1, wherein the predetermined key is mounted on an outside of the wireless terminal.

4. The method as claimed in claim 3, wherein the predetermined key is a volume key mounted on the outside of the wireless terminal.

5. The method as claimed in claim 1, wherein the list of the broadcast programs for channels includes a channel name and a program name.

6. The method as claimed in claim 1, wherein, in displaying the created list of the current broadcast programs, the created list of the current broadcast programs is displayed through a scheme for slidably scrolling the list of the current broadcast programs in a transverse direction.

7. The method as claimed in claim 1, wherein, in displaying the created list of the current broadcast programs, the created list of the current broadcast programs is displayed through a scheme for slidably scrolling the list of the current broadcast programs in an upward or downward direction.

8. The method as claimed in claim 1, wherein detecting the digital broadcast program guide data comprises:

comparing the determined current time with broadcast time information of broadcast programs for channels included in the digital broadcast program guide data; and detecting digital broadcast program guide data for channels having broadcast time information including the current time.

9. The method as claimed in claim 8, wherein detecting the digital broadcast program guide data for channels further comprises:

determining if the stored digital broadcast program guide data is updated before detecting a second digital broadcast program guide data for channels; and updating the stored digital broadcast program guide data if the stored digital broadcast program guide data is not updated.

10. The method as claimed in claim 1, further comprising displaying the list of the broadcast programs for channels on the internal display part if the sub-body is opened in a state where the list of the broadcast programs for channels is displayed on the external display part.

11. The method as claimed in claim 10, further comprising outputting a program broadcasted through a predetermined channel if the predetermined channel is selected in the list of the broadcast programs for channels displayed on the internal display part.

12. The method as claimed in claim 11, wherein outputting the program broadcasted through the predetermined channel comprises reading out detailed information about the program currently broadcasted through the predetermined channel from the detected program guide data for channels and displaying the detailed information if the predetermined channel is selected in the list of the broadcast programs for channels.

* * * * *